(12) United States Patent
Fu et al.

(10) Patent No.: US 10,350,743 B2
(45) Date of Patent: Jul. 16, 2019

(54) HANDHELD ELECTRIC TOOL

(71) Applicant: CHERVON (HK) LIMITED, Wanchai (HK)

(72) Inventors: Huixing Fu, Nanjing (CN); Fangjie Nie, Nanjing (CN); Toshinari Yamaoka, Nanjing (CN); Fangtian Deng, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 371 days.

(21) Appl. No.: 15/258,364

(22) Filed: Sep. 7, 2016

(65) Prior Publication Data

US 2017/0066119 A1 Mar. 9, 2017

(30) Foreign Application Priority Data

| Sep. 8, 2015 | (CN) | 2015 1 0568374 |
| Dec. 24, 2015 | (CN) | 2015 1 0992221 |
| Dec. 24, 2015 | (CN) | 2015 1 0993197 |
| Dec. 24, 2015 | (CN) | 2015 1 0996457 |

(51) Int. Cl.
*A01G 3/08* (2006.01)
*B25F 5/00* (2006.01)

(52) U.S. Cl.
CPC .............. *B25F 5/008* (2013.01); *A01G 3/086* (2013.01)

(58) Field of Classification Search
CPC ......... B25F 5/008; A01G 20/43; A01G 3/086; A01G 3/062
USPC ...................... 173/77–78, 130, 106, 198, 217
See application file for complete search history.

(56) References Cited

U.S. PATENT DOCUMENTS

| 3,343,613 | A | * | 9/1967 | Carnesecca, Jr. | ...... A01G 3/033 173/169 |
| 5,802,724 | A | * | 9/1998 | Rickard | ................. A01D 34/90 30/276 |
| 6,971,456 | B2 | * | 12/2005 | Yamada | ................... B25F 5/008 173/168 |
| 7,308,950 | B2 | * | 12/2007 | Faatz | ..................... B25F 5/008 173/170 |
| 8,020,304 | B2 | * | 9/2011 | MacE | ................ B27B 17/0008 30/296.1 |

(Continued)

FOREIGN PATENT DOCUMENTS

CN 103448036 A 12/2013

*Primary Examiner* — Robert F Long
(74) *Attorney, Agent, or Firm* — Greenberg Traurig, LLP

(57) ABSTRACT

A handheld electric tool includes a working device for performing a function of the handheld electric tool, a powering device for provide a driving force to the working device, and a connecting device for connecting the working device and powering device. The powering device includes: an electric motor, a power housing having an air inlet and an air outlet, a transmission mechanism for transmitting power generated by the electric motor and a circuit board for controlling the electric motor, a fan can be driven by the electric motor to provide an airflow which flows from the air inlet to the air outlet. The circuit board, the transmission mechanism and the electric motor are disposed between the air inlet and the air outlet such that the airflow flows through the circuit board, the transmission mechanism and the electric motor successively. The handheld electric tool has excellent cooling effect.

16 Claims, 19 Drawing Sheets

(56) References Cited

U.S. PATENT DOCUMENTS

| | | | | |
|---|---|---|---|---|
| 2003/0196824 A1* | 10/2003 | Gass | ................... | B23B 31/123 |
| | | | | 173/131 |
| 2004/0263008 A1* | 12/2004 | Voigt | ................... | B25F 5/008 |
| | | | | 310/58 |
| 2005/0045354 A1* | 3/2005 | Arimura | ............... | B25B 21/00 |
| | | | | 173/219 |
| 2006/0290213 A1* | 12/2006 | Furui | ................... | B25F 5/008 |
| | | | | 310/58 |
| 2008/0141541 A1* | 6/2008 | Hurley | ............. | A01D 34/4163 |
| | | | | 30/276 |
| 2009/0245958 A1* | 10/2009 | Lau | ...................... | B25F 5/008 |
| | | | | 408/125 |
| 2011/0147030 A1* | 6/2011 | Blum | ................... | B25F 5/008 |
| | | | | 173/216 |
| 2014/0144663 A1* | 5/2014 | Fuchs | .................. | B25F 5/008 |
| | | | | 173/216 |
| 2015/0367497 A1* | 12/2015 | Ito | ............................ | B25F 5/02 |
| | | | | 173/217 |
| 2018/0177135 A1* | 6/2018 | Fu | .......................... | A01G 3/053 |

\* cited by examiner

HANDHELD ELECTRIC TOOL

CROSS REFERENCE TO RELATED APPLICATION

This application claims the benefit under 35 U.S.C. § 119(a) of Chinese Patent Application No. CN 201510568374.8, filed on Sep. 8, 2015, Chinese Patent Application No. CN 201510996457.7, filed on Dec. 24, 2015, Chinese Patent Application No. CN 201510993197.8, filed on Dec. 24, 2015, Chinese Patent Application No. CN 201510992221.6, filed on Dec. 24, 2015, the disclosure of each is incorporated herein by reference in their entirety.

FIELD OF THE DISCLOSURE

The disclosure relates to a handheld electrical tool.

BACKGROUND OF RELATED ART

A handheld power tool includes a working device and a powering device. The powering device is for providing a driving force to the working device. When the powering device uses electricity as energy source, such handheld power tool can also be referred to as handheld electric tool. Commonly used handheld power tools are hedge trimmers, grass trimmers, pole saws, etc.

Powering devices using electricity as energy source typically include an electric motor, a circuit board, and a transmission device. However, the arrangement of the electric motor, the circuit board and the transmission device of the traditional powering device is oftentimes unreasonable and/or unsatisfactory for its intended purpose as heat generated by the electric motor and the circuit board during a working process cannot be dissipated in time and thereby can lead to malfunction and damage.

Traditional handheld power tools further include a manipulating device, and the manipulating device is often provided with a trigger for controlling the start of the machine and a manipulating member for speed control. The traditional manipulating member for speed control is disposed just above a handle, which may make it difficult for a user to control the speed while also controlling the trigger.

In order to facilitate transportation and storage, the known handheld power tools often include two detachable long-rod structures. With this arrangement, before using the tool, it is needed to plug the two long-rod structures together to integrally connect the internal transmission shafts contained within the long-rod structures. However, for the traditional plugged structure, the transmission shafts in the long-rod structures each have a large degree of freedom, thus producing a wobble such that the two transmission shafts are not easily combined into an integral structure.

Previous power tools typically include a prime mover, a transmission mechanism, and a tool accessory. The transmission mechanism transmits power outputted by the prime mover to the tool accessory. According to various types of prime movers, power tools can be classified into an engine type tool and an electric tool. For the engine type tool, an oil tank is often equipped therewith for containing a fuel such as gasoline or diesel. For the electric tool, in order to lubricate the transmission mechanism and the tool accessory, an oil tank also is usually equipped therewith.

Commonly used power tools include a lawn mower, a hedge trimmer, a grass trimmer, a snowplow, a chain saw, etc. A chain saw is a type of cutting tool and mainly used for logging operations. In order to cut overhead branches of tree, a chain saw may be provided with a connecting rod, and such a chain saw is usually called as pole saw. A chain saw includes a chain and a guide plate. The guide plate is formed with a guiding groove, and the chain moves in the guiding groove at high-speed to perform a cutting function. A typical chain saw further includes an oil tank, and the oil tank is for supplying oil to the chain so as to achieve lubrication.

After the power tool is used for a period of time, the oil in the oil tank is consumed and the tank may be depleted. Therefore, the user often needs to open a tank cover to refuel the oil tank, which can easily result in the problem of losing the often disassembled tank cover.

SUMMARY

Accordingly, in order to overcome at least some of the shortcomings in the background, an objective of the disclosure is to provide a handheld electric tool with relatively high cooling efficiency.

In order to achieve the above objective, the disclosure proposes the following technical solutions.

A handheld electric tool may include: a working device configured (i.e., structured and arranged) to perform a function of the handheld electric tool, a powering device configured to provide a driving force to the working device, and a connecting device configured to connect the working device and the powering device. The powering device may include: an electric motor configured to generate a driving force, a power housing configured to accommodate the electric motor, a fan driven by the electric motor, a transmission mechanism configured to transmit the driving force generated by the electric motor, and a circuit board configured to control the electric motor. The power housing is disposed with an air inlet for allowing an airflow to enter into the power housing during the fan rotating and an air outlet for allowing the airflow to be exhausted out of the power housing during the fan rotating. The circuit board, the transmission mechanism and the electric motor are disposed between the air inlet and the air outlet such that the airflow flows through the circuit board, the transmission mechanism and the electric motor successively.

Furthermore, the power housing has a middle plane, the power housing is at least partly symmetrical with respect to the middle plane, and the air inlet is disposed at a side of the middle plane.

Furthermore, the power housing at least is disposed with the air outlet and the air inlet at two sides of the circuit board.

Furthermore, the power housing at least is disposed with the air inlet and the air outlet at a same side of the circuit board.

Furthermore, the air outlet is multiple, and the multiple air outlets are disposed at two sides of the middle plane.

Furthermore, a position of the air inlet and a position of the circuit board are arranged correspondingly.

Furthermore, a position of the air outlet and a position of the fan are arranged correspondingly.

Furthermore, the handheld electric tool may include: a manipulating handle for facilitating a user to manipulate the handheld electric tool. The manipulating handle is disposed between the powering device and the working device.

Furthermore, the connecting device may include: a connecting tube configured to connect the powering device and the manipulating handle, and an output shaft configured to output power of the electric motor. The working device may include: an inserting tube configured to butt with the connecting tube, and an input shaft configured to butt with the output shaft. The connecting tube and the inserting tube constitute a detachable connection.

Furthermore, the handheld electric tool further may include: a sleeve device configured to secure connection of the connecting tube with the inserting tube. The sleeve device may include: a sleeve having opposite two ends; one end of the sleeve is for butting with the connecting tube, and the other end of the sleeve is for butting with the inserting tube.

Another handheld power tool may include: a working device for performing a function of the handheld power tool, a powering device configured to provide a driving force to the working device, and a connecting device configured to connect the working device and the powering device. The powering device may include: a motor configured to generate the driving force. The connecting device may include: an output shaft configured to deliver power of the motor, and a connecting tube configured to accommodate the output shaft. The working device may include: an input shaft configured to butt with the output shaft, and an inserting tube configured to accommodate the input shaft. The connecting tube and the inserting tube form a detachable connection. At least one of the connecting device and the working device may include: a shaft coupler configured to deliver torque between the output shaft and the input shaft. The shaft coupler at least partly is inserted into the connecting tube or the inserting tube, and a rotation supporting member for making the shaft coupler be rotatable with respect to the connecting tube or the inserting tube is disposed between the connecting tube and the inserting tube.

Furthermore, the handheld power tool may include: a sleeve device configured to make the connecting tube and the inserting tube form a detachable connection. The sleeve device may include a sleeve having opposite two ends, one end of the sleeve is configured to butt with the connecting tube, and the other end of the sleeve is configured to butt with the inserting tube.

Furthermore, the sleeve and the connecting tube are fixedly connected; the sleeve and the inserting tube constitute a movable connection.

Furthermore, the sleeve device may include a locking assembly configured to limit the inserting tube to escape out from the sleeve.

Furthermore, an inner wall of the sleeve is formed with a sleeve rib protruding from the inner wall of the sleeve; the connecting tube and the inserting tube respectively are located at two sides of the sleeve rib.

Furthermore, the rotation supporting member is disposed between the connecting tube or the inserting tube and the sleeve rib.

Furthermore, an outer side of the shaft coupler is formed with a position-limiting step for limiting a position of the rotation supporting member. The rotation supporting member is disposed between the position-limiting step and the sleeve rib.

Furthermore, the shaft coupler is formed with: a transmission slot configured to allow the output shaft to be inserted, and an insertion slot configured to allow the input shaft to be inserted. The transmission slot and the insertion slot are located at opposite two ends of the shaft coupler.

Furthermore, the handheld power tool may include: a manipulating handle for a user to manipulate the handheld power tool. The manipulating handle is disposed between the powering device and the working device.

Furthermore, the handheld power tool may further include: an anti-abrasive block disposed on the powering device. When the handheld power tool is vertically placed, the anti-abrasive block can prevent the powering device from being in contact with the ground.

Still another handheld electric tool may include: an electric motor and a manipulating device. The manipulating device is for a user to manipulate. The manipulating device may include: a handle casing configured to form a manipulating handle for the user to grasp, a main control switch configured to control the electric motor whether is powered or not, a speed control switch configured to control a rotation speed of the electric motor, a main control manipulating member configured to allow the user to manipulate the main control switch, and a speed control manipulating member configured to allow the user to manipulate the speed control switch. The manipulating handle has a middle plane, the manipulating handle is disposed being symmetrical with respect to the middle plane, and the speed control manipulating member is disposed at a side of the middle plane.

Furthermore, the speed control manipulating member is slidably connected to the handle casing.

Furthermore, the handle casing is formed with a slide supporting surface configured to support the speed control manipulating member to slide on the outer side of the handle casing. The slide supporting surface is a plane and obliquely intersected with the middle plane.

Furthermore, the main control manipulating member is disposed below the manipulating handle, the speed control manipulating member is located at a side of and above the manipulating handle.

Furthermore, the manipulating device may further include: a safety manipulating member configured to prevent the user from mistakenly triggering the main control manipulating member. The safety manipulating member is disposed above the manipulating handle.

Furthermore, the handle casing further is formed with an accommodating part configured to accommodate the speed control switch. The accommodating part and the manipulating handle are arranged in front and at the rear respectively. The speed control manipulating member is disposed at a side of and above the accommodating part.

Furthermore, the speed control manipulating member is disposed on the top left of the accommodating part.

Furthermore, the safety manipulating member and the main control manipulating member are located at opposite two sides of the manipulating handle.

Furthermore, the handheld electric tool may include: a working device configured to perform a function of the handheld electric tool, a powering device configured to provide a driving force to the working device, and a connecting device configured to connect the working device and the powering device. The powering device may include a power housing and an electric motor. The power housing accommodates the electric motor therein.

Furthermore, the connecting device may include: a connecting tube configured to connect the powering device and the manipulating handle, and an output shaft configured to output power of the electric motor. The working device may include: an inserting tube configured to butt with the connecting tube, and an input shaft configured to butt with the output shaft. The connecting tube and the inserting tube constitute a detachable connection.

A power tool may include: a tool body and an oil tank. The tool body may include: a tool accessory for performing tool function, a transmission mechanism configured to drive the tool accessory, and a prime mover configured to drive the transmission mechanism. The oil tank may include: a tank body formed with an oil inlet, a tank cover configured to seal the oil inlet, a filter including a filter screen, and a connecting assembly configured to connect the tank cover. The tank body is formed with an accommodating chamber configured to accommodate the filter. The filter is installed into the accommodating chamber. The connecting assembly connects the tank cover to the tank body, the filter or the tool body. The tank body further is formed with an oil outlet for outputting oil to the tool accessory, the transmission mechanism or the prime mover.

Furthermore, the power tool may include: a working part configured to install the tool accessory, a powering part configured to install the prime mover, and a connecting part configured to connect the working part and the powering part into an integral. The oil tank is disposed on the working part. The connecting part may include: a connecting rod connected to the working part and the powering part, and a transmission shaft configured to output power of the prime mover to the tool accessory. The transmission shaft is disposed in the connecting rod.

Furthermore, the power tool is a chain saw, and the tool accessory is a chain.

Furthermore, the oil tank adapted for the power tool may include: a tank body, a tank cover, a filter and a connecting assembly. The tank body is formed with an oil inlet. The tank cover is configured to seal the oil inlet. The filter may include a filter screen. The connecting assembly is connected to the tank cover and the filter. The tank body is formed with an accommodating chamber, and the accommodating chamber is configured to accommodate the filter. The filter is installed into the accommodating chamber. A portion of the connecting assembly connected to the filter is located in the accommodating chamber.

Furthermore, the filter further may include: a supporting frame configured to secure the filter screen. The connecting assembly is fixed to the supporting frame.

Furthermore, the supporting frame is formed with an installing hole. The connecting assembly may include: a first connecting member fixed to the installing hole. The first connecting member at least partly passes through the installing hole.

Furthermore, the tank cover may include: a cover body configured to allow a user to disassemble the tank cover, a sealing gasket configured to seal the tank cover, and a fixing member secured to the sealing gasket. The sealing gasket is installed onto the cover body. The cover body fixes the tank cover to the tank body. The connecting assembly is connected to the fixing member.

Furthermore, the fixing member is formed with a fixing hole. The connecting assembly may include: a second connecting member secured to the fixing hole. The second connecting member at least partly passes through the fixing hole.

Furthermore, the connecting assembly may include: a first connecting member connected to the filter, a second connecting member connected to the tank cover, and a flexible member configured to avoid the tank cover to be far away from the tank body. The flexible member is connected to the first connecting member and the second connecting member.

Furthermore, the tank cover may include: a cover body for facilitating a user to disassemble the tank cover, and a sealing gasket configured to seal the tank cover. The cover body may include: a cover body top portion configured to cover the oil inlet, and a cover body side portion configured to fix the tank cover to the tank body. The cover body top portion and the cover body side portion cooperatively form a cover body chamber. The sealing gasket is disposed in the cover body chamber. The cover body top portion is formed with a disassembly groove for facilitating a user to disassemble. The disassembly groove is formed at an opposite direction with respect to the cover body chamber.

Accordingly, the disclosure can achieve the advantages that the handheld electric tool has excellent cooling effect and therefore the cooling efficiency is high.

DETAILED DESCRIPTION

In the following, with reference to accompanying drawings and concrete embodiments, the disclosure will be described in detail.

Figure 1:
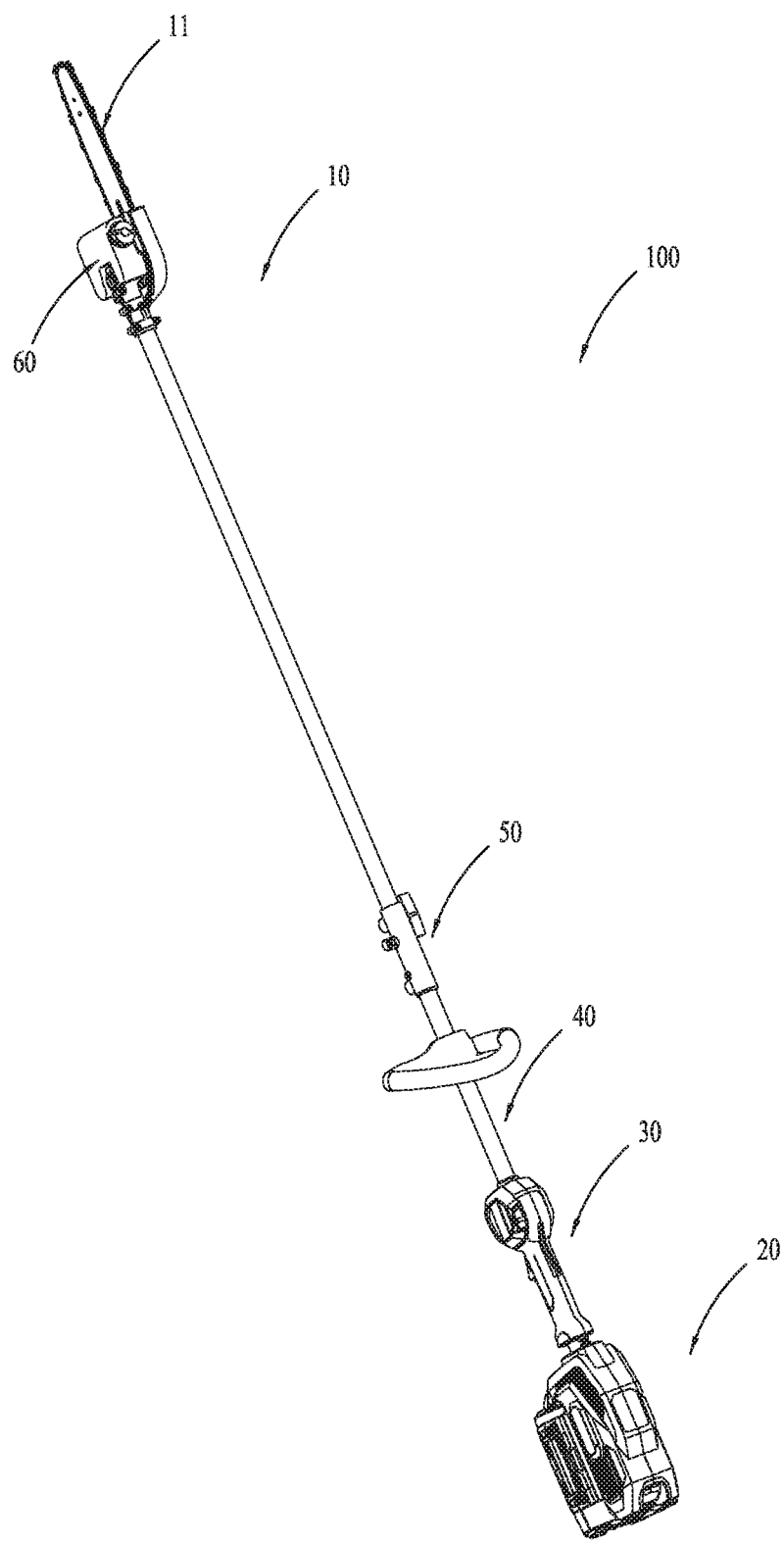
FIG. 1 shows one example of a handheld electric tool.

An example handheld power tool 100 as illustrated in FIG. 1 includes a working device 10, a powering device 20, a manipulating device 30, a connecting device 40, and a sleeve device 50.

The working device 10 is configured (i.e., structured and arranged) for performing a function of the handheld power tool 100. The working device 10 includes a working element 11. In FIG. 1, the working element 11 is a chain saw, and correspondingly the handheld power tool 100 is a pole saw. It should be noted that the working element 11 is not limited to a chain saw, but may be any suitable accessory including, for instance, a grass trimmer for, a pruning blade for hedge trimming, etc.

Figure 2:
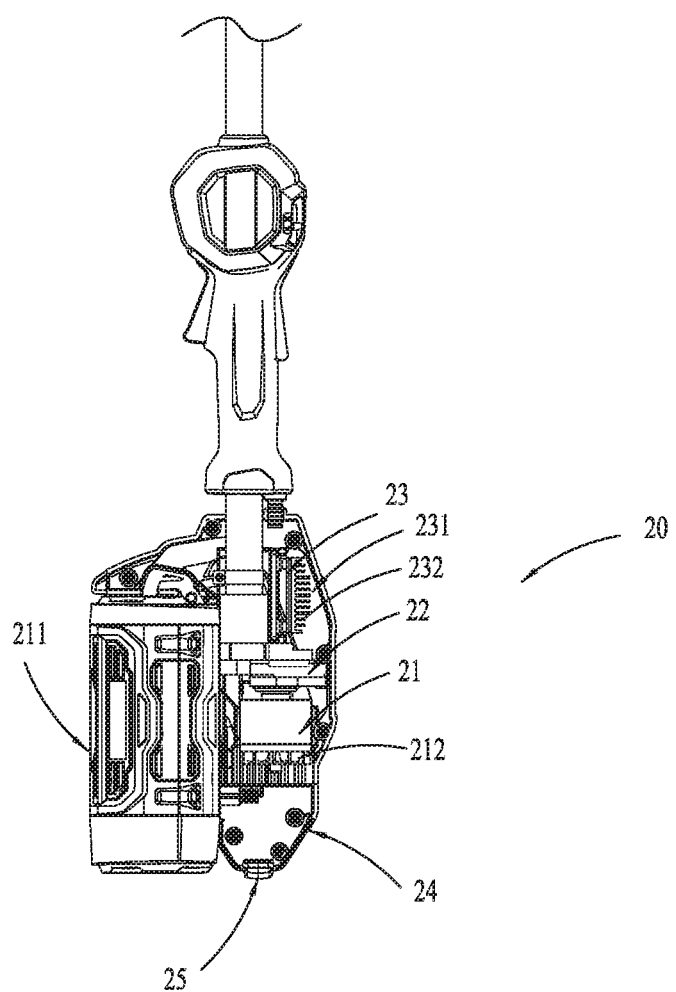
FIG. 2 is a schematic view of a powering device in FIG. 1.

The powering device 20 is configured to provide a driving force to the working device 10. As illustrated in FIG. 2, the example power device 20 includes a motor 21, a transmission mechanism 22, a circuit board 23, and a power housing 24. The motor 21 is for generating the driving force and may be an internal combustion engine using fuel combustion as its energy source, or an electric motor using electricity as its energy source. The motor 21 as illustrated in FIG. 2 is an electric motor, when the electric motor is employed to generate power, the handheld power tool can also be called as handheld electric tool. As illustrated in FIG. 2, the handheld electric motor further includes a battery pack 211 for supplying power to the electric motor. In this example, the battery pack 211 is detachably/removably connected to the power housing 24.

Figure 3:
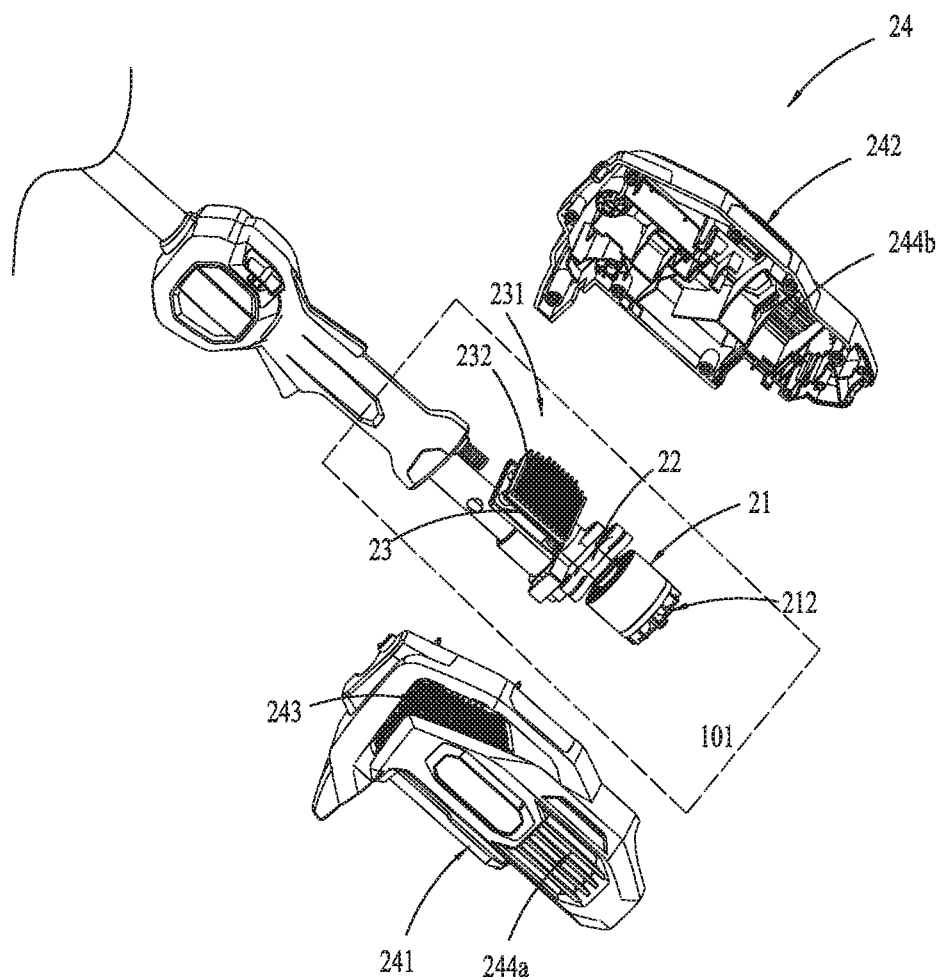
FIG. 3 is a partially exploded view of the powering device in FIG. 1.
Figure 4:
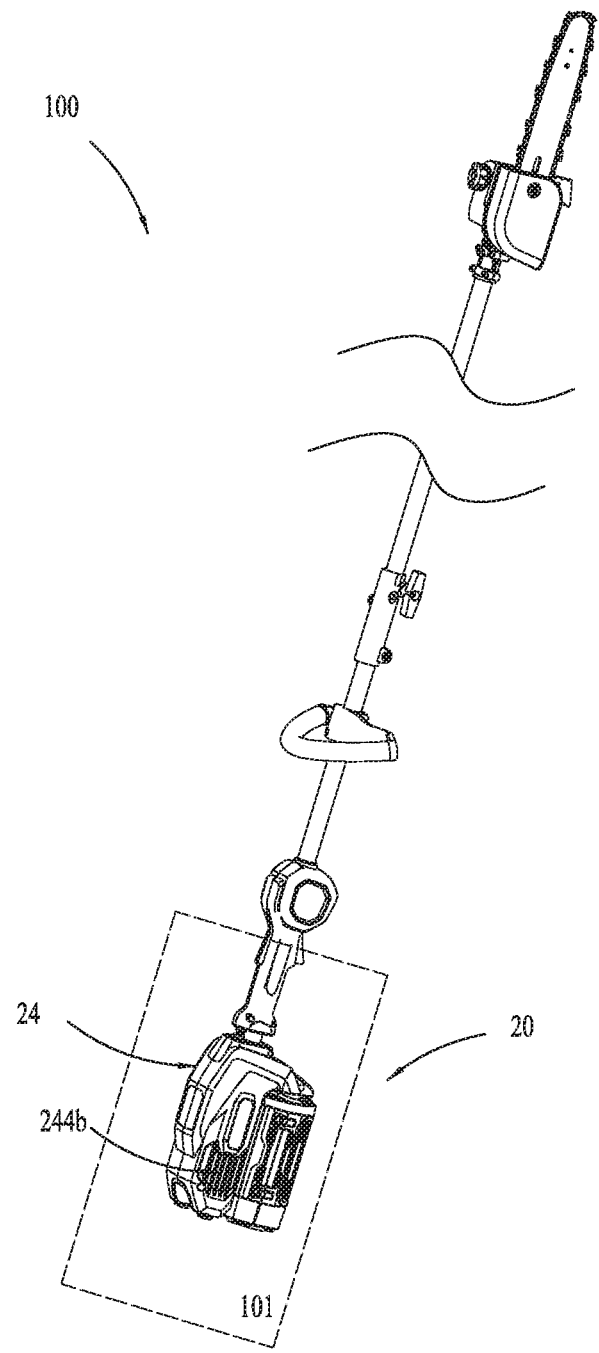
FIG. 4 is a schematic view of an air outlet of the powering device in FIG. 1.

The transmission mechanism 22 is configured to transmit power generated by the electric motor to the working element 11. The circuit board 23 is configured to control operation of the power tool 100, including the example electric motor. As illustrated in FIG. 2 and FIG. 3, the power housing 24 accommodates the electric motor therein. Moreover, the power housing 24 further accommodates the transmission mechanism 22 and the circuit board 23 therein, and whereby the electric motor, the transmission mechanism 22 and the circuit board 23 are housed in the power housing 24. The transmission mechanism 22 includes a transmission gear, and the transmission gear is disposed inside the power housing 24. The transmission mechanism 22 may be a gear box. As illustrated in FIG. 2 and FIG. 3, the electric motor includes or is connected to a fan 212, and the fan 212 can be driven by the electric motor to rotate. The electric motor may be an outer rotor motor, the fan 212 is disposed at an end of the electric motor and is centrifugal fan.

As illustrated in FIG. 3, the power housing 24 includes a left housing 241 and a right housing 242. The left housing 241 and the right housing 242 together wrap the electric motor. The power housing 24 defines an air inlet 243 and air outlets 244a, 244b therein. When the fan 212 rotates, airflow enters into the power housing 24 from the air inlet 243, then sequentially flows through the circuit board 23, the transmission mechanism 22 and the electric motor and finally is exhausted out of the power housing 24 from the air outlets 244a, 244b.

As illustrated in FIG. 1 through FIG. 4, the power housing 24 has a middle plane (also referred to as midsplit plane) 101, and the power housing 24 at least partly is symmetrical with respect to the middle plane 101. In particular, the left housing 241 and the right housing 242 are at least partly symmetrical with respect to the middle plane 101. The air inlet 243 is disposed at a side of the middle plane 101. More specifically, the air inlet 243 is disposed on the left housing 241 and whereby the left housing 241 forms the air inlet 243.

The air inlet 243 and the air outlet 244b are positioned at opposite sides of the circuit board 23. In particular, the right housing 242 forms the air outlet 244b.

The air inlet 243 and the air outlet 244a may be positioned at a same side of the circuit board 23. In particular, the left housing 241 forms the air outlet 244a.

As illustrated in FIG. 1 through FIG. 4, the left housing 241 and the right housing 242 are formed with the air outlets 244a, 244b. The air outlets 244a, 224b are disposed at two sides of the middle plane (also referred to as midsplit plane) 101 respectively.

The air outlets 244a, 244b are disposed corresponding to the position of the fan 212. The rotation of the fan 212 can bring airflow rapidly to be exhausted out from the air outlets 244a, 244b, so as to achieve relatively high cooling efficiency. The position of the air inlet 243 and the position of the circuit board 23 are arranged correspondingly. Specifically, the circuit board 23 is disposed with a heat sink 231 thereon, the heat sink 232 is formed with protruding heat-dissipating ribs 232, and each two adjacent heat-dissipating ribs 232 define a heat-dissipating channel. Airflow entered from the air inlet 243 would flow into the heat-dissipating channels, which facilitates rapid heat-dissipating. The airflow after passing through the heat-dissipating channels will flow through the transmission mechanism 22 to cool the transmission mechanism 22. The airflow of cooling the transmission mechanism 22 then flows through the electric motor and then is exhausted out from the air outlets 244a, 244b. During the working process, the circuit board 23 typically generates the largest amount of heat and thus, in this example, the airflow is routed to cool the circuit board 23 first and thus can effectively reduce the temperature of the circuit board 23 and then proceed to sequentially cool the transmission mechanism 22 and the electric motor so that a high cooling efficiency is achieved.

Figure 5:
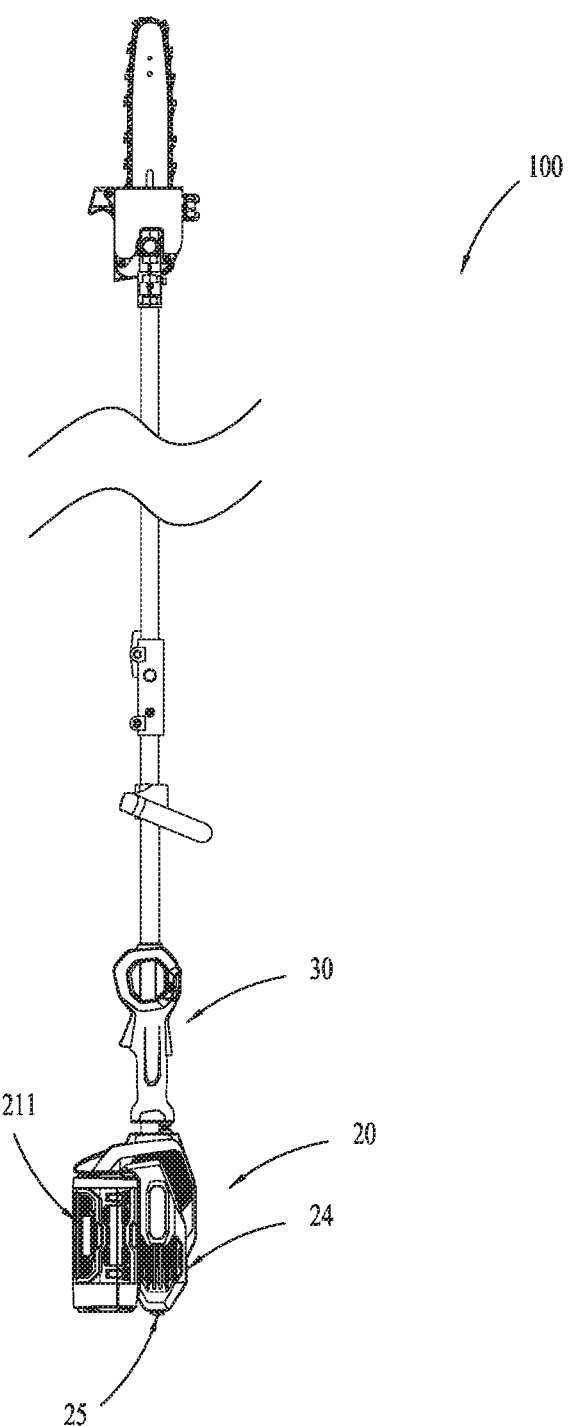
FIG. 5 is a schematic view of installation of an anti-abrasive block on the powering device in FIG. 1.

As illustrated in FIG. 2 and FIG. 5, the handheld power tool 100 further includes an anti-abrasive block 25. The anti-abrasive block 25 is disposed on the powering device 20. Specifically, the anti-abrasive block 25 is disposed on the power housing 24. Referring to the placing state as shown in FIG. 5, i.e., when the handheld power tool 100 is vertically placed, the anti-abrasive block 25 can prevent the powering device 20 from directly contacting the ground. Moreover, the anti-abrasive block 25 can prevent the battery pack 211 from directly contacting the ground. In this example, the anti-abrasive block 25 is made of a rubber material.

Figure 6:
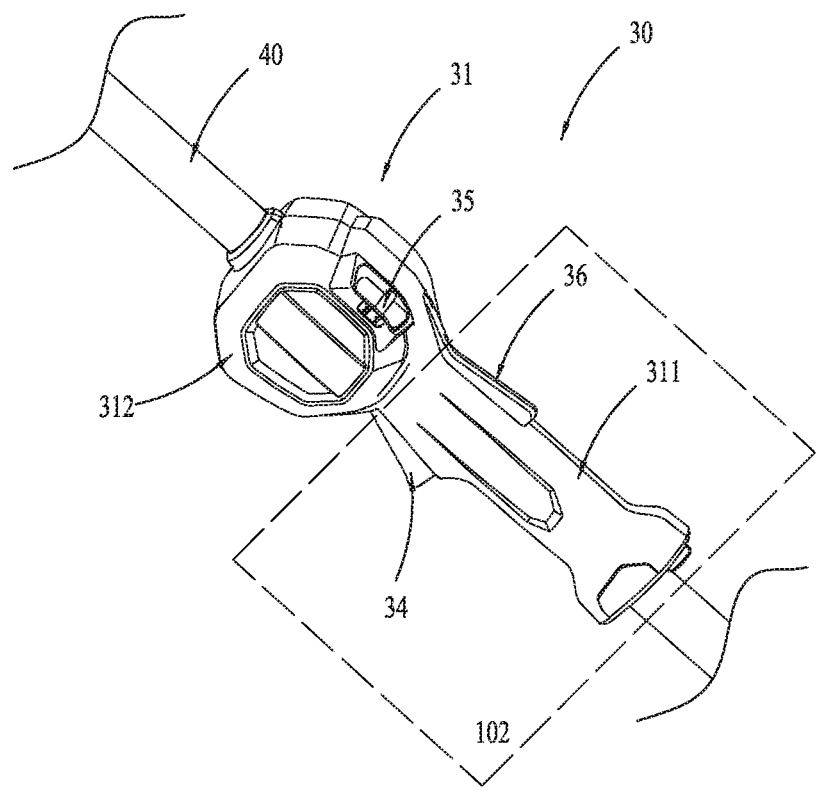
FIG. 6 is a schematic view of a manipulating device in FIG. 1.
Figure 7:
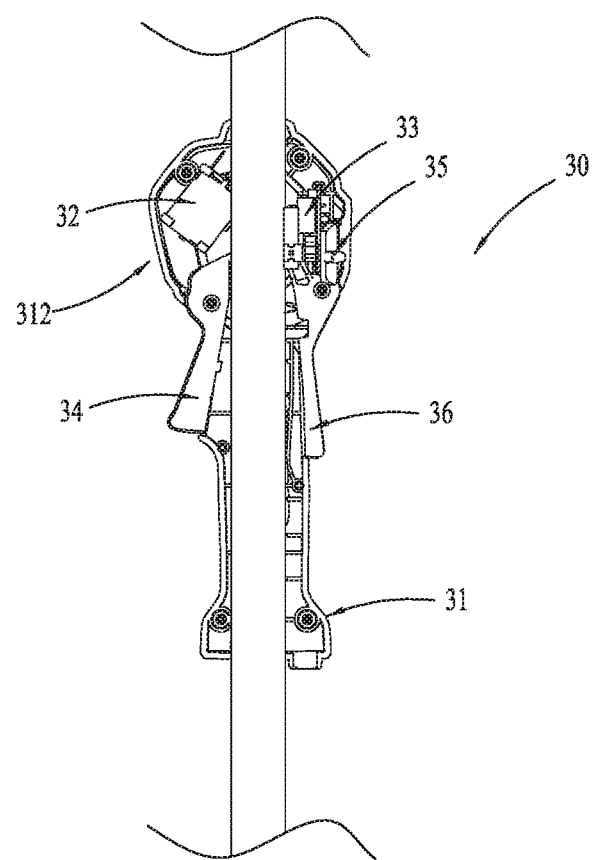
FIG. 7 is a schematic view of the manipulating device of FIG. 6 after a part of housing being removed.

Meanwhile, the manipulating device 30 is for the user to manipulate so as to control the handheld power tool 100. As illustrated in FIG. 6 and FIG. 7, the example manipulating device 30 includes a handle casing 31, a main control switch 32, a speed control switch 33, a main control manipulating member 34, a speed control manipulating member 35 and a safety manipulating member 36.

As illustrated in FIG. 6, the handle casing 31 is formed with a manipulating handle 311 and an accommodating part 312. The manipulating handle 311 is for the user to grasp so as to manipulate the handheld electric tool. It will be appreciated that the handle casing may be integrally formed with the power housing and at this situation a part of the power housing acts as the handle casing.

Figure 8:
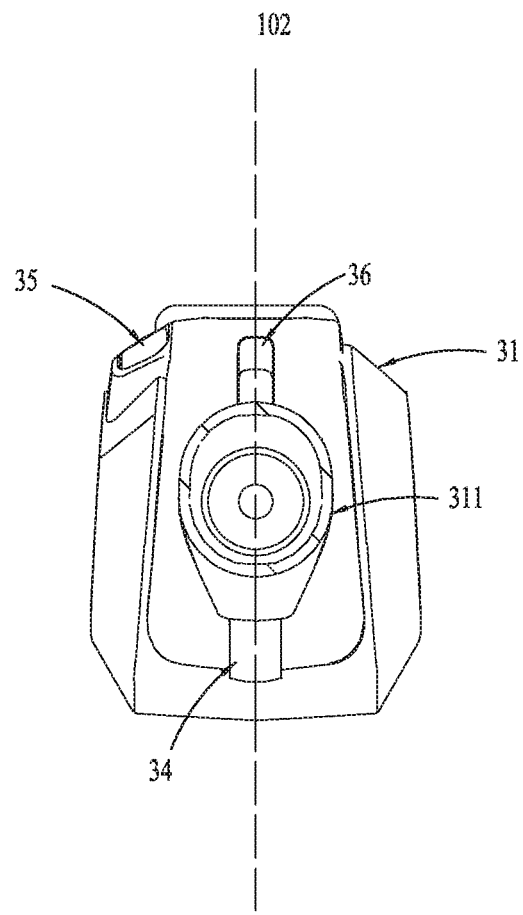
FIG. 8 is another perspective view of the manipulating device in FIG. 6.

As illustrated in FIG. 1, the example manipulating device 30 is disposed between the powering device 20 and the working device 10. Specifically, referring to FIG. 1 and FIG. 6, the manipulating handle 311 is disposed between the powering device 20 and the working device 10. As illustrated in FIG. 6 through FIG. 8, the manipulating handle 311 has a middle plane 102, and the manipulating handle 311 is symmetrical with respect to the middle plane 102. The main control switch 32 is configured to control whether the electric motor is powered or not. The speed control switch 33 is configured to control the rotation speed of the electric motor. The main control manipulating member 34 is used for the user to manipulate the main control switch 32, and the speed control manipulating member 35 is used for the user to manipulate the speed control switch 33. The speed control manipulating member 35 is disposed at a side of the middle plane 102. In particular, the speed control manipulating member 35 can slide relative to the handle casing 31 and specifically is slidably coupled to the handle casing 31. More specifically, the handle casing 31 is formed with a slide supporting surface. The slide supporting surface supports the speed control manipulating member 35 to slide on the outer side of the handle casing 31. The slide supporting surface is a plane and obliquely intersected with the middle plane 102.

The main control manipulating member 34 is disposed below the manipulating handle 311. The speed control manipulating member 35 is located at a side of and above the manipulating handle 311. The safety manipulating member 36 is for preventing the user from mistakenly touching the main control manipulating member 34 and thereby avoiding a situation where the electric motor can start in an undesired situation. The safety manipulating member 36 is located above the manipulating handle 311.

The accommodating part 312 accommodates/receives the speed control switch 33 therein. The accommodating part 312 further accommodates the main control switch 32 therein. The accommodating part 312 and the manipulating handle 311 are disposed in front and at the rear respectively. The speed control manipulating member 35 is disposed at a side of and above the accommodating part 312. In particular, the speed control manipulating member 35 is disposed on the top left of the accommodating part 312.

The safety manipulating member 36 and the main control manipulating member 34 are located at opposite sides of the manipulating handle 311. Referring to the orientation as shown in FIG. 8, the safety manipulating member 36 is located on the top of the manipulating handle 311, the main control manipulating member 34 is located on the bottom of the manipulating handle 311, and the speed control manipulating member 35 is located at a side of and on the top of the manipulating handle 311. In this configuration, when the user grasps the manipulating handle 311, it is easy to unlock the safety manipulating member 36 with the palm of her/his hand and then start the main control manipulating member 34 with her/his finger. At the same time, the user can use her/his forefinger to touch the speed control manipulating member 35 for speed control. The positions of the various manipulating members are ergonomic and thus easy to operate.

Figure 9:
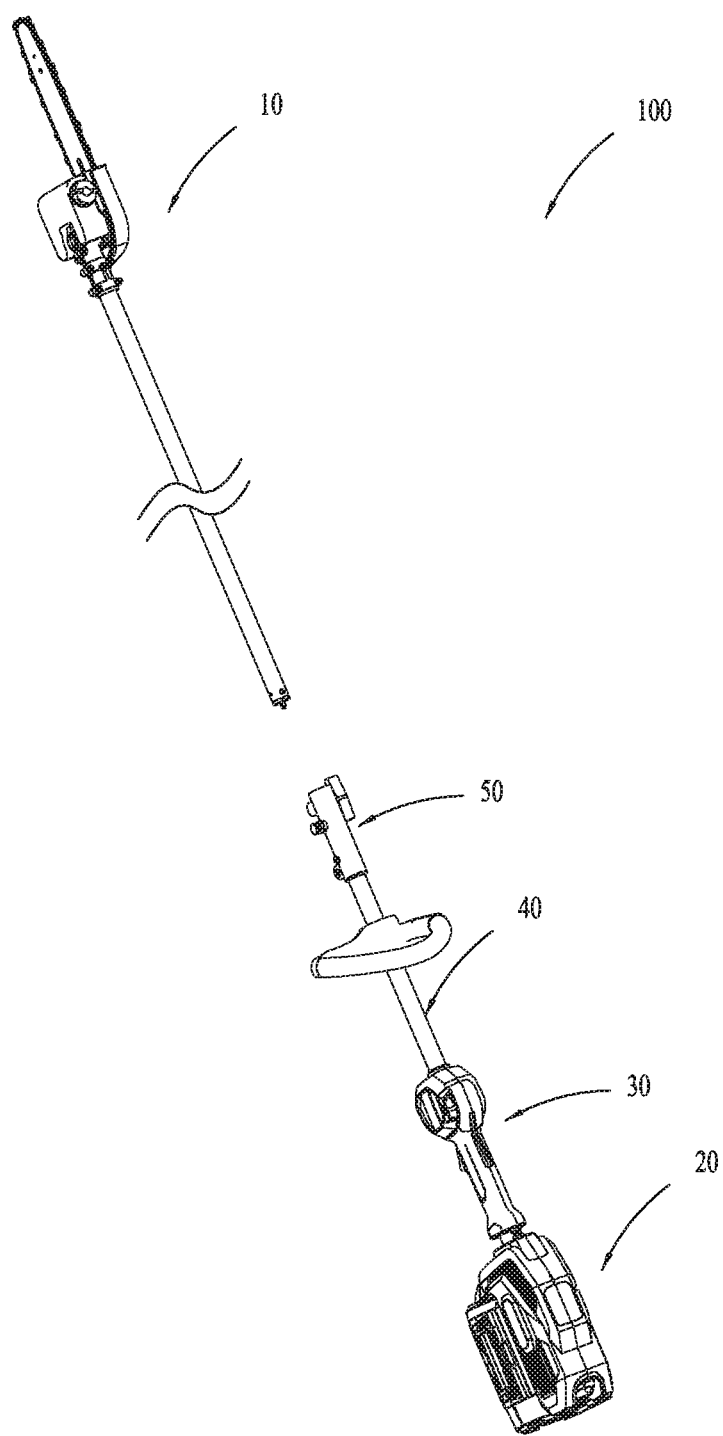
FIG. 9 is a schematic view of installation of a working device and a sleeve device in FIG. 1.
Figure 10:
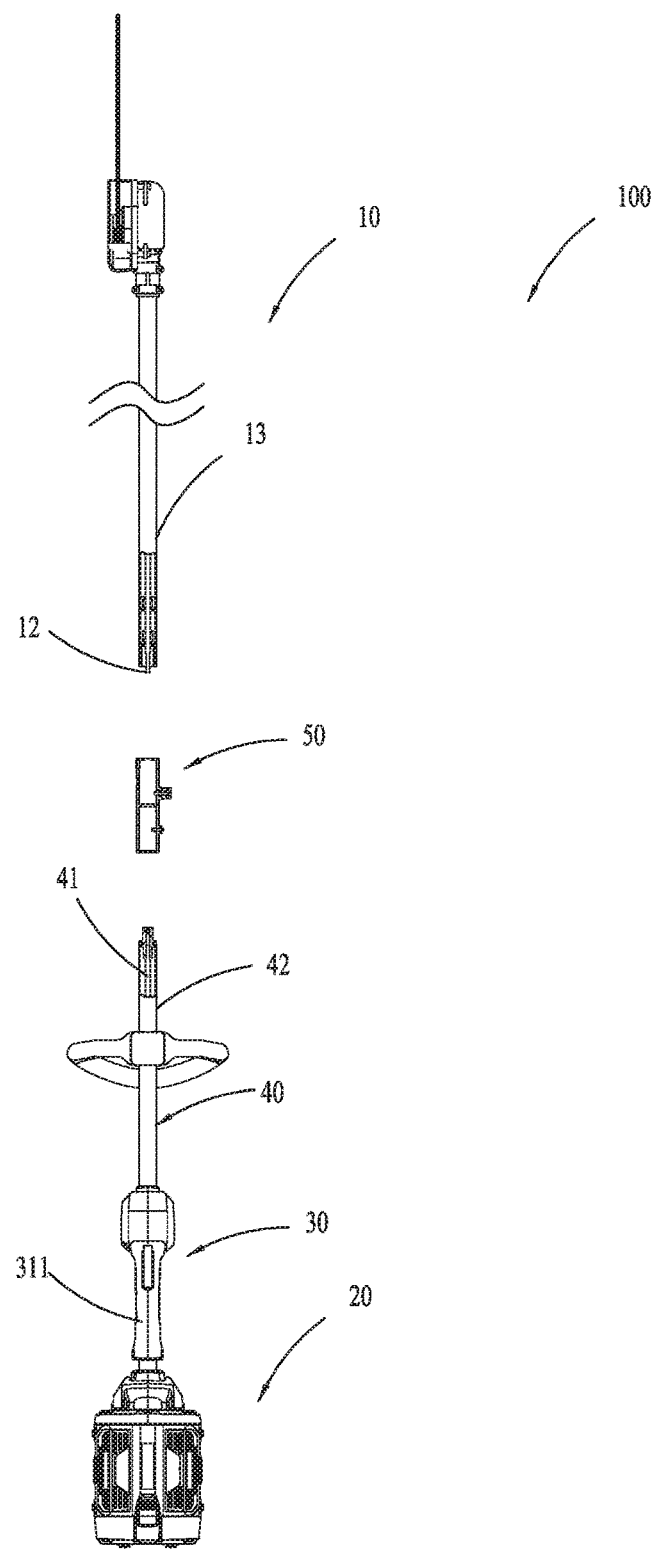
FIG. 10 is a schematic view of the sleeve device in FIG. 1.

As illustrated in FIG. 9 and FIG. 10, the connecting device 40 connects the working device 10 with the powering device 20. The connecting device 40 includes an output shaft 41 and a connecting tube 42. The working device 10 includes an input shaft 12 and an inserting tube 13. The output shaft 41 is for delivering power of the motor 21. The connecting tube 42 is for receiving/accommodating the output shaft 41. The output shaft 41 at least partly locates in the connecting tube 42. The connecting tube 42 connects the powering device 20 and the manipulating handle 311.

Figure 11:
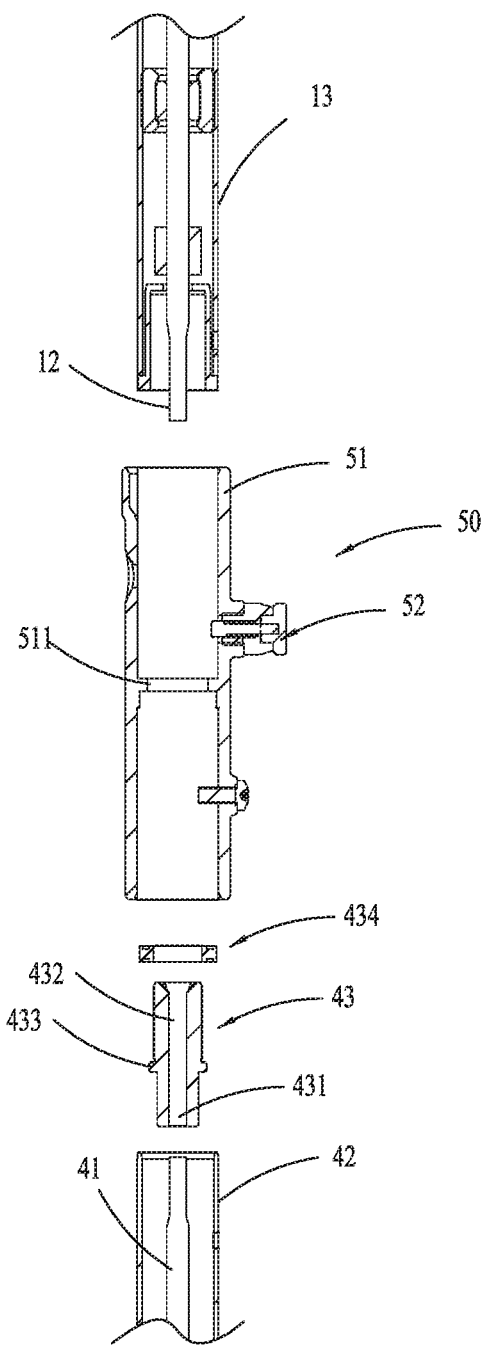
FIG. 11 is a partially exploded view of a connecting device, the sleeve device and the working device in FIG. 1.
Figure 12:
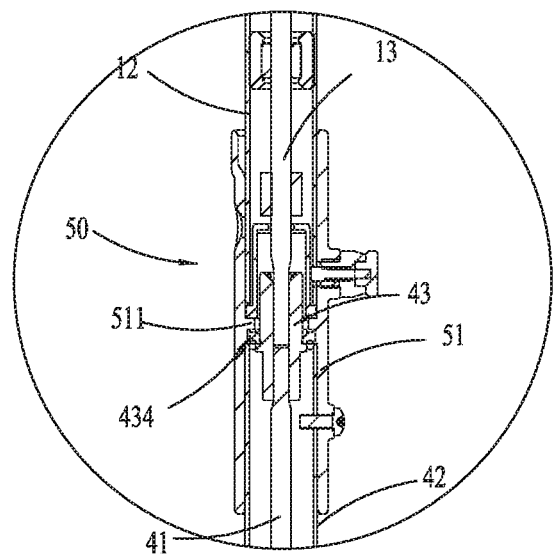
FIG. 12 is a partial cross-sectional view of the connecting device, the sleeve device and the working device in FIG. 1.
Figure 13:
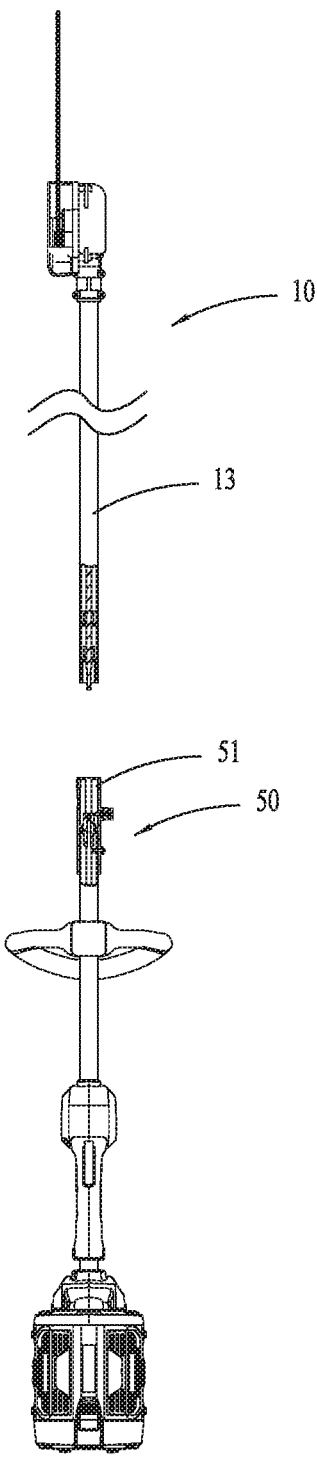
FIG. 13 is a schematic view of the working device and the sleeve device of FIG. 1 being in a separated/disassembled state.
Figure 14:
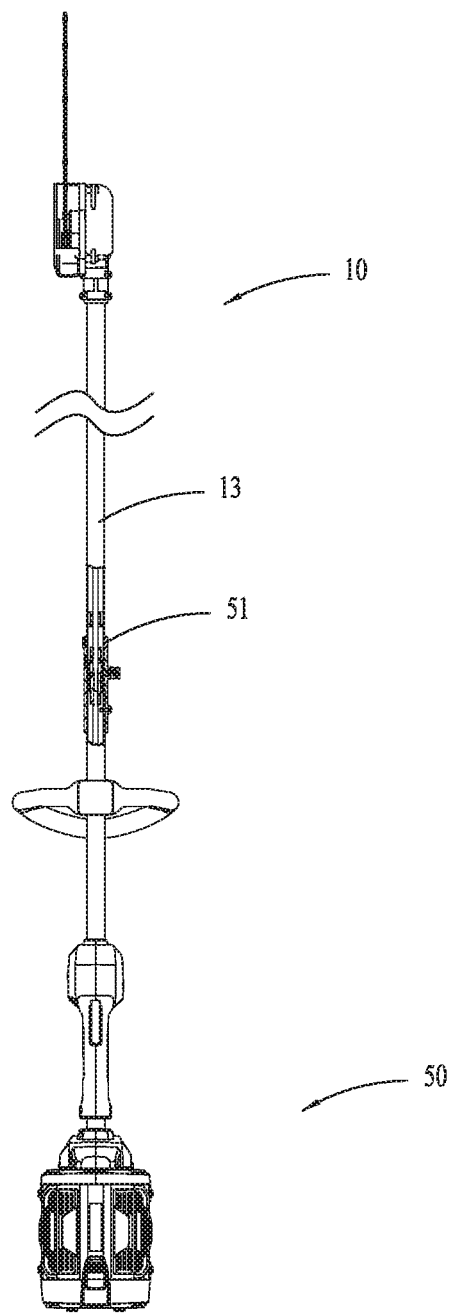
FIG. 14 is a schematic view of the working device and the sleeve device of FIG. 1 being in an assembled state.

The handheld power tool 100 further includes the sleeve device 50. Referring to FIG. 9 through FIG. 12, the sleeve device 50 facilitates the connecting tube 42 and the inserting tube 13 to be detachably connected. The sleeve device 50 includes a sleeve 51 and a locking assembly 52. The sleeve 51 has a first end and a second opposite to the first end. The first end of the sleeve 51 is for abutting the connecting tube 42, and the second end is for abutting the inserting tube 13. Referring to FIG. 13, the sleeve 51 is fixed to the connecting tube 42, the sleeve 51 is movably connected with the inserting tube 13, the state as shown in FIG. 13 is a state of the sleeve 51 and the inserting tube 13 being separated, and the state as shown in FIG. 14 is a state of the sleeve 51 and the inserting tube 13 being connected/assembled. As illustrated in FIG. 11 and FIG. 12, the sleeve 51 has a sleeve rib 511 formed on its inner wall. The sleeve rib 511 protrudes from the inner wall of the sleeve 51. The connecting tube 42 and the inserting tube 13 respectively are located two sides of the sleeve rib 511.

As illustrated in FIG. 11 and FIG. 12, the locking assembly 52 is for limiting the inserting tube 13 to exit out from the sleeve 51. The input shaft 12 and the output shaft 41 abut each other, so as to facilitate the power outputted from the motor 21 to be transmitted to the working device 10. The inserting tube 13 is for accommodating the input shaft 12. The input shaft 12 at least partly locates in the inserting tube 13. The connecting tube 42 and the inserting tube 13 together form a detachable connection. In particular, at least one of the connecting device 40 and the working device 10 includes a shaft coupler 43. The shaft coupler 43 connects the input shaft 12 and the output shaft 41 and delivers torque between the output shaft 41 and the input shaft 12. The shaft coupler 43 is formed with a transmission slot 431 and an insertion slot 432. The transmission slot 431 is used for the output shaft 41 being inserted, and the insertion slot 432 is used for the input shaft 12 being inserted. The transmission slot 431 and the insertion slot 432 are located at two opposite ends of the shaft coupler 43 respectively.

The shaft coupler 43 is at least partially inserted into the connecting tube 42 or the inserting tube 13. A rotation supporting member 434 for facilitating the shaft coupler 43 to be rotatable relative to the connecting tube 42 or the inserting tube 13 is disposed between the connecting tube 42 and the inserting tube 13. In particular, the rotation supporting member 434 is disposed at an end of the connecting tube 42. The rotation supporting member 434 is disposed between the connecting tube 42 or inserting tube 13 and the sleeve rib 511. The outer side of the shaft coupler 43 is formed with a position-limiting step 433. The position-limiting step 433 is used for limiting the position of the rotation supporting member 434. The rotation supporting member 434 is disposed between the position-limiting step 433 and the sleeve rib 511. The rotation supporting member 434 is for fixing the shaft coupler 43 to make the shaft coupler 43 have less wobble, so that when the user installs the working device 10, the input shaft 12 can be accurately inserted into the insertion slot 432. The rotation supporting member 434 supports the shaft coupler 43 and correspondingly supports the input shaft 12 and the output shaft 41, so as to reduce vibration during the rotation of the input shaft 12 and the output shaft 41. In particular, the rotation supporting member 434 is a bearing, and more specifically is a rolling bearing.

As illustrated in FIG. 1, the example handheld power tool 100 further includes an oil tank 60.

Figure 15:
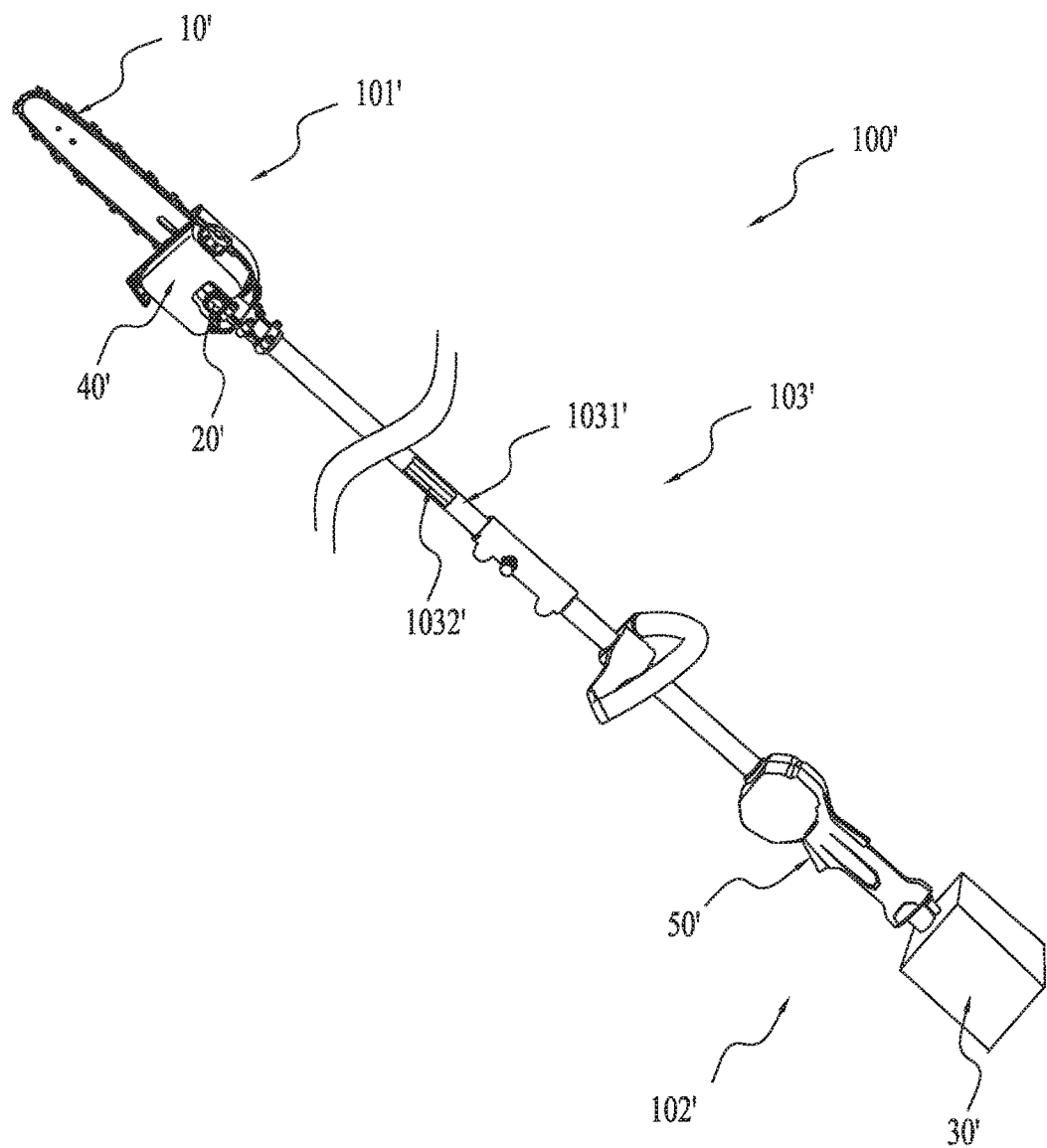
FIG. 15 shows another example of a power tool.

An example power tool 100' as shown in FIG. 15 includes a tool accessory 10', a transmission mechanism 20', a prime mover 30', an oil tank 40' and a control trigger 50'. A structure of the oil tank 40' is same as the structure of the oil tank 60 of the handheld power tool 100 as shown in FIG. 1. The tool body as a main part of the power tool 100' includes the tool accessory 10', the transmission mechanism 20' and the prime mover 30'.

The tool accessory 10' is used for realizing the function of the tool. A commonly used tool accessory 10' may be a cutting blade, a grass trimmer, a chain, or other suitable accessory. In particular, as shown in FIG. 15, the example power tool 100' is a chain saw, and the tool accessory 10' is a chain. The transmission mechanism 20' is for driving the tool accessory 10', and the prime mover 30' is for driving the transmission mechanism 20'. The prime mover 30' may be an internal combustion engine using combustion of fuel as its energy source, or an electric motor using electricity as its energy source. When the prime mover 30' employed by the power tool 100' is an electric motor, a battery pack generally is equipped to supply the electric motor with power. The oil tank 40' contains oil for supplying the tool accessory 10', the transmission mechanism 20' or the prime mover 30' with oil. The oil contained in the oil tank 40' may be used as a fuel oil of the internal combustion engine such as gasoline, diesel and so on, or used as lubrication oil for lubricating. The control trigger 50' is for controlling the prime mover 30'.

As illustrated in FIG. 15, the power tool 100' includes a working part 101', a powering part 102' and a connecting part 103'. The tool accessory 10' and the oil tank 40' are installed onto the working part 101'. The prime mover 30' is installed onto the powering part 102'. When the power tool 100' is included with a battery pack, the battery pack usually is installed onto the powering part 102'. The connecting part 103' is for connecting the working part 101' and the powering part 102' to make the working part 101', the powering part 102' and the connecting part 103' are integrally formed. Specifically, the connecting part 103' includes a connecting rod 1031' and a transmission shaft 1032'. The connecting rod 1031' is a hollow long rod-shaped structure and connects the working part 101' and the powering part 103'. The transmission shaft 1032' is disposed in the connecting rod 1031' and for outputting the power of the prime mover 30' to the tool accessory 10'. In particular, the prime mover 30' drives the transmission shaft 1032' to rotate and thereby to drive the tool accessory 10' to work.

Figure 16:
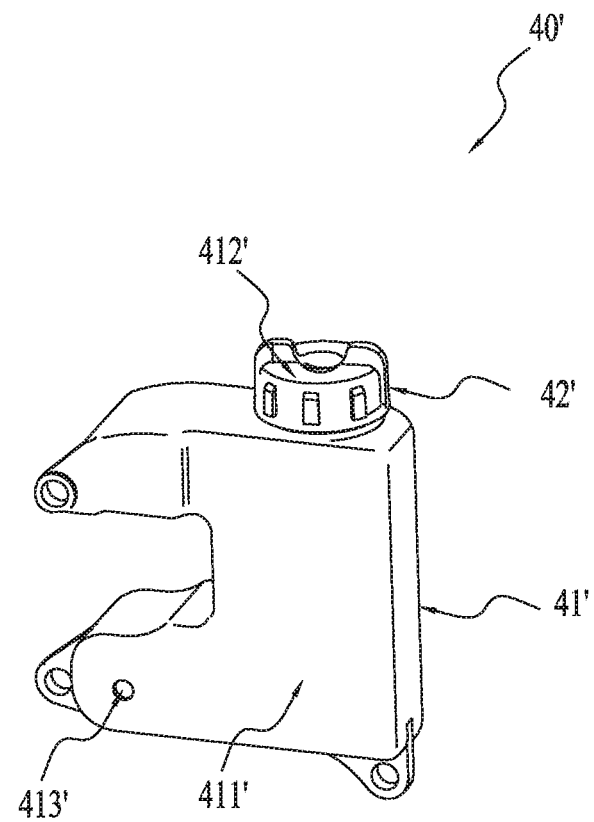
FIG. 16 is a schematic view of an oil tank of the power tool in FIG. 15.
Figure 17:
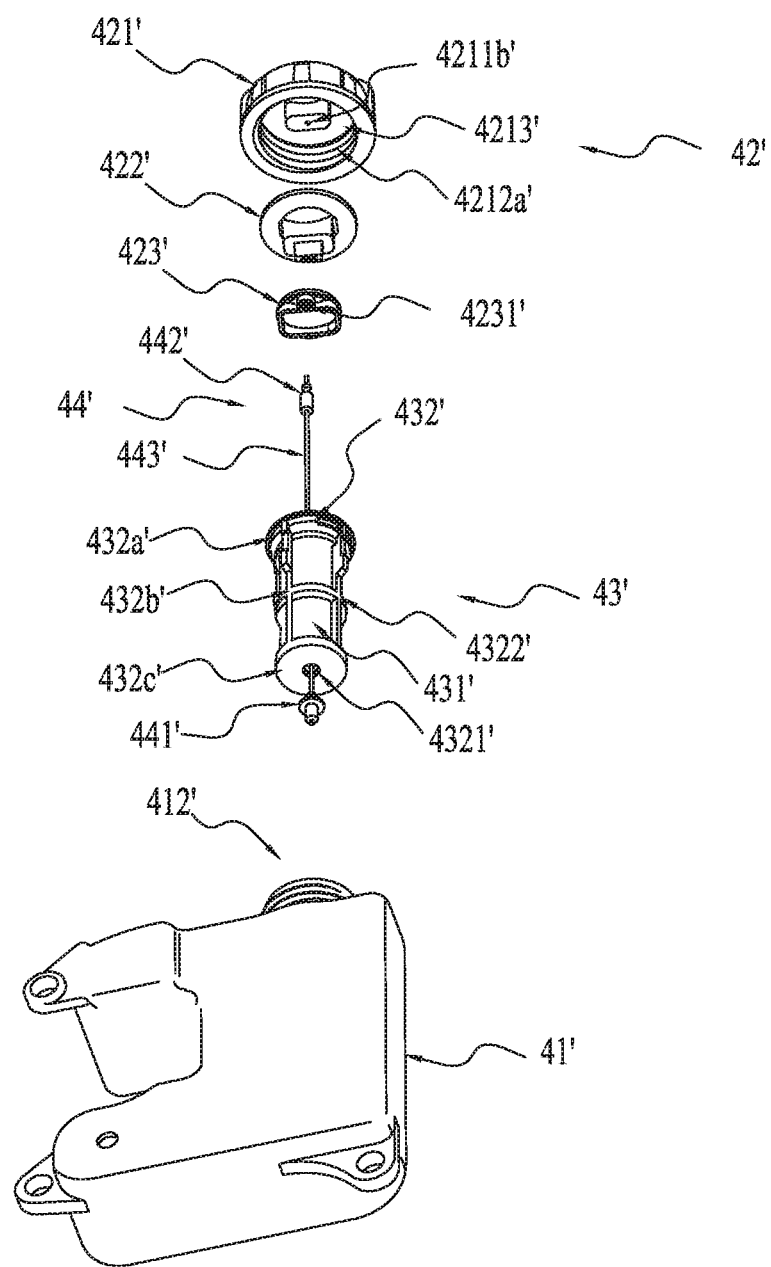
FIG. 17 is an exploded view of the oil tank in FIG. 16.
Figure 18:
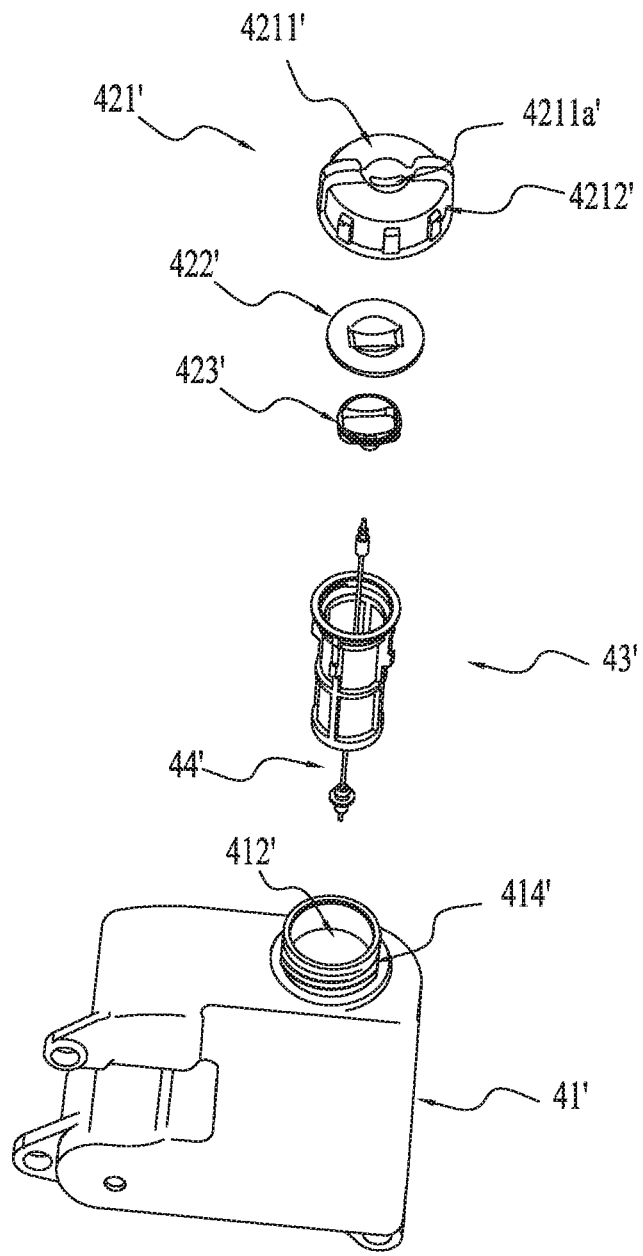
FIG. 18 is another perspective exploded view of the oil tank in FIG. 16.
Figure 19:
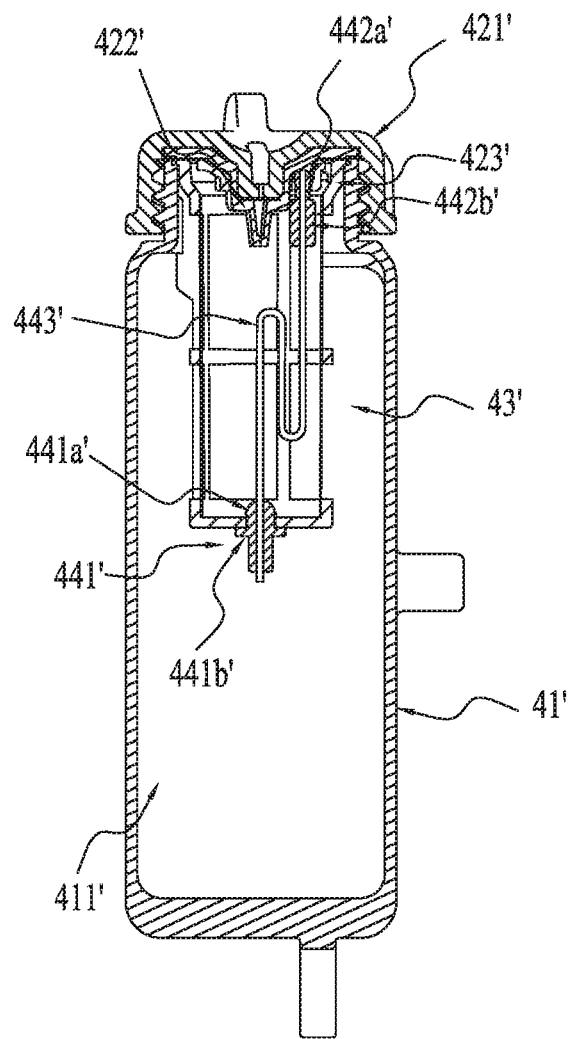
FIG. 19 is a cross-sectional view of the oil tank in FIG. 16.

As illustrated in FIG. 16, the oil tank 40' includes a tank body 41' and a tank cover 42'. The tank body 41' is formed with an accommodating chamber 411', an oil inlet 412' and an oil outlet 413'. The user can inject oil into the accommodating chamber 411' through the oil inlet 412'. The oil contained in the accommodating chamber 411' is supplied to outside via the oil outlet 413' during operation of the power tool 100'. Furthermore, for a chain saw, the oil tank 40' is for supplying oil to the chain so as to achieve lubrication. Generally speaking, an oil pump is employed, and the oil pump is connected with the oil outlet 413' so as to pump out the oil from the oil tank 40'. The tank cover 42' is for sealing the oil inlet 412', so as to prevent debris from entering into the accommodating chamber 411' when there is no need of refueling. As illustrated in FIG. 17 through FIG. 19, the oil tank 40' further includes a filter 43'. The filter 43' is disposed in the accommodating chamber 411'. Specifically, as shown in FIG. 17, the filter 43' includes a filter screen 431' and a supporting frame 432', and the filter screen 431' is for filtering the oil entering into the accommodating chamber 411'. The supporting frame 432' fixes the filter screen 431'. The supporting frame 432' includes an upper portion 432*a*', a middle portion 432*b*' and a lower portion 432*c*'. The upper portion 432*a*' is fixed to the oil inlet 412' and formed with a circular opening. The middle portion 432*b*' is formed with ribs 4322' for connecting the upper portion 432*a*' and the lower portion 432*c*'. The lower portion 432*c*' is substantially disc-shaped.

In order to prevent the detachment of the tank lid 42' and reduce liter or loss during injecting or refilling oil into the accommodating chamber 411', as illustrated in FIG. 17 or FIG. 18, the oil tank 40' further includes a connecting assembly 44'. The connecting assembly 44' connects the filter 43' and the tank cover 42'. The connecting assembly 44' connects the tank cover 42' to the tank body 41', the filter 43' or the tool body. Specifically, the connecting assembly 44' is disposed in the accommodating chamber 411' of the oil tank 40', so as to prevent the connecting assembly 44' from being exposed outside the oil tank 40' thereby limiting scratching and/or breakage. Meanwhile, the connecting assembly 44' connects the filter 43', so that the filter 43', the tank cover 42' and the connecting assembly 44' are integrally formed, which facilitates the production assembly and maintenance and also can avoid the loss of the filter 43' in the course of using.

More specifically, as illustrated in FIG. 17 through FIG. 19, the connecting assembly 44' includes a first connecting member 441', a second connecting member 442' and a flexible member 443'. The first connecting member 441' connects the filter 43', and the second connecting member 442' connects the tank cover 42'. The flexible member 443' connects the first connecting member 441' and the second connecting member 442'. In particular, the flexible member 443' is a rope, and the first connecting member 441' and the second connecting member 442 are plastic products. The flexible member 443' limits a distance of the second connecting member 442' away from the first connecting member 441', so as to limit a distance of the tank cover 42' away from the filter 43'. The connecting assembly 44' is fixed to the supporting frame 432'. Specifically, as illustrated in FIG. 17 through FIG. 19, the supporting frame 432' is formed with an installing hole 4321' and the installing hole 4321' specifically is disposed on the lower part 432*c*' of the supporting frame 432' and is circular. The first connecting member 441' at least partly penetrates through the installing hole 4321' and thereby the first connecting member 441' is fixed to the installing hole 4321'.

As shown in FIG. 17 through FIG. 19, the tank cover 42' includes a cover body 421', a sealing gasket 422' and a fixing member 423'. The cover body 421' includes a cover body top portion 4211' and a cover body side portion 4212'. The cover body top portion 4211' is for covering the oil inlet 412'. The cover body side portion 4212' protrudes from the cover body top portion 4211' outwardly. The cover body top portion 4211' and the cover body side portion 4212' cooperatively define a cover body chamber 4213'. A side of the cover body side portion 4212' located in the cover body chamber 4213' is formed with an internal thread, and the internal thread is engaged with an external thread formed on the tank body 41' to make the tank cover 42' be fixed to the tank body 41'. The sealing gasket 422' is located in the cover body chamber 4213' and installed onto the cover body 421' so as to achieve a seal. The cover body 421' has an uneven surface so as to increase friction force and facilitate to grasp the cover body 421' by hand, and this part acts as an manipulating part of the cover body 421' for allowing the user to disassemble the tank cover 42', so that when the user grasps the manipulating part of the cover body 421' by hand to rotate, the purpose of installing or disassembling the tank cover 42' can be realized. When the tank cover 42' is over tightened, it is oftentimes not enough to disassemble and/or remove the tank cover 42' by hand directly. Moreover, the cover body top portion 4211' is formed with a disassembly groove 4211*a*', and the disassembly groove 4211*a*' is formed at an opposite orientation with respect to the cover body chamber 4213', i.e., outside of the cover body 421'. The disassembly groove 4211*a*' may accept the head of a screwdriver, and thus the user can use an electric screwdriver to disassemble or installing the tank cover 42'. Specifically, the disassembly groove 4211*a*' is formed with a linear shape and can be matched with a linear shaped screwdriver head. The cover body 421' further is formed with an air inlet 4211*b*'. The air inlet 4211*b*' is disposed in the disassembly groove 4211*a*'. When the oil tank 40' supplies oil to outside, air can flow into the accommodating chamber 411' from the air inlet 4211*b*', so as to achieve the same air pressure inside and outside the accommodating chamber 411' and thus it is easy to supply oil. The fixing member 423' is fixed to the sealing gasket 422' and located in the cover body chamber 4213'. The fixing member 423' is for installing the connecting assembly 44', and the connecting assembly 44' is connected to the fixing member 423'. The fixing member 423' defines a fixing hole 4231' therein. The second connecting member 442' of the connecting assembly 44' at least partly penetrates through the fixing hole 4231' to make the second connecting member 442' be fixed to the fixing hole 4231'.

As illustrated in FIG. 19, the flexible member 443' is embeddedly fixed to the first connecting member 441' and the second connecting member 442'. The first connecting member 441' includes a first buckle portion 441a' and a position-limiting portion 441b'. The second connecting member 442' includes a second buckle portion 442a' and a stopper portion 442b'. The position-limiting portion 441b' is a cylindrical body, and a diameter thereof is larger than the maximum dimension of the installing hole 4321'. The stopper portion 442b' is a cylindrical body, and a diameter thereof is less than the maximum dimension of the installing hole 4321' but greater than the maximum dimension of the fixing hole 4231'. When assembled, the second connecting member 442' firstly passes through the installing hole 4321' of the supporting frame 432', and then the second buckle portion thereof is inserted into the fixing hole 4231' of the fixing member 423'. The second buckle portion is to prevent the second connecting member 442's from escaping out of the fixing hole 4231', and the stopper portion is to prevent the second connecting member 442' from being passed through the fixing hole 4231'. After that, the first buckle portion 441a' of the first connecting member 441' is inserted into the installing hole 4321'. The first buckle portion 441a' is to prevent the first connecting member 441' from escaping out of the installing hole 4321', and the position-limiting portion 441b' is to prevent the first connecting member 441' from being passed through the installing hole 4321'.

The basic principles, main features and advantages of the disclosure have been shown and described above. It should be understood to the skilled person in the art that the above embodiments do not limit the disclosure in any form, and any technical solution obtained in the way of equivalent replacement or equivalent transformation ought to be within the scope of protection of the disclosure.

We claim:

1. A handheld electric tool comprising:
    a working device for performing a function of the handheld electric tool;
    a powering device operably coupled to the working device by a connecting device, the powering device configured to provide a driving force to the working device, the powering device comprising:
        an electric motor configured to generate the driving force;
        a fan coupled to and driven by the electric motor;
        a power housing configured to accommodate the electric motor, the power housing having an air inlet for allowing an airflow to enter into the power housing during the fan rotating and an air outlet for allowing the airflow to be exhausted out of the power housing during the fan rotating;
        a transmission mechanism, coupled to the electric motor and the working device and configured to transmit the driving force from the electric motor to the working device; and
        a circuit board operably coupled to the electric motor and configured to control the electric motor;
    a manipulating device for a user to manipulate, the manipulating device comprising:
        a handle casing forming a manipulating handle for the user to grasp;
        a main control switch coupled to the electric motor and configured to control an operation of the electric motor;
        a speed control switch coupled to the electric motor and configured to control a rotation speed of the electric motor;
        a main control manipulating member disposed below the manipulating handle to allow the user to manipulate the main control switch; and
        a speed control manipulating member located at a side of and above the manipulating handle to allow the user to manipulate the speed control switch; and
        a safety manipulating member disposed above the manipulating handle to prevent the user from mistakenly triggering the main control manipulating member,
    wherein the circuit board, the transmission mechanism, and the electric motor are disposed between the air inlet and the air outlet such that the airflow flows proximate to the circuit board, the transmission mechanism, and the electric motor successively, and
    wherein the manipulating handle has a middle plane and the manipulating handle is symmetrical with respect to the middle plane.

2. The handheld electric tool as claimed in claim 1, wherein the power housing has a housing middle plane, the power housing is at least partly symmetrical with respect to the housing middle plane, and the air inlet is disposed at a side of the housing middle plane.

3. The handheld electric tool as claimed in claim 1, wherein the power housing is disposed with the air outlet and the air inlet at opposite sides of the circuit board.

4. The handheld electric tool as claimed in claim 1, wherein the power housing is disposed with the air inlet and the air outlet at a same side of the circuit board.

5. The handheld electric tool as claimed in claim 2, wherein the air outlet is disposed at opposite sides of the housing middle plane.

6. The handheld electric tool as claimed in claim 1, wherein
    the manipulating handle is disposed between the powering device and the working device.

7. The handheld electric tool as claimed in claim 1, wherein
    the connecting device comprises:
        a connecting tube coupling the power device and the manipulating handle; and
        an output shaft, coupled to the electric motor to output power of the electric motor; and
    the working device comprises:
        an inserting tube, detachably coupleable with the connecting tube; and
        an input shaft, detachably coupleable with the output shaft.

8. The handheld electric tool as claimed in claim 7, wherein at least one of the connecting device and the working device comprises:
    a shaft coupler, configured to deliver torque between the output shaft and the input shaft, the shaft coupler at least partially insertable into at least one of the connecting tube or the inserting tube; and
    a rotation supporting member disposed between the connecting tube and the inserting tube for rotation with respect to at least one of the connecting tube or the inserting tube.

9. The handheld electric tool as claimed in claim 8, wherein the handheld electric tool further comprises:

a sleeve device, configured to secure connection of the connecting tube with the inserting tube, the sleeve device comprising a sleeve, having a first end and a second end opposite to the first end, the first end configured to connect with the connecting tube, and the second end configured to connect with the inserting tube.

10. The handheld electric tool as claimed in claim 9, wherein an inner wall of the sleeve is formed with a sleeve rib protruding from the inner wall of the sleeve and the connecting tube and the inserting tube are respectively located at opposite sides of the sleeve rib.

11. The handheld electric tool as claimed in claim 10, wherein the rotation supporting member is disposed between one of the connecting tube or the inserting tube and the sleeve rib.

12. The handheld electric tool as claimed in claim 10, wherein an outer side of the shaft coupler is formed with a position-limiting step configured to limit a position of the rotation supporting member and the rotation supporting member is disposed between the position-limiting step and the sleeve rib.

13. The handheld electric tool as claimed in claim 1, wherein the speed control manipulating member is slidably connected to the handle casing.

14. The handheld electric tool as claimed in claim 1, wherein the handle casing further comprises an accommodating part configured to accommodate the speed control switch, the accommodating part and the manipulating handle are arranged in front of and at the rear of the handle casing, respectively, and the speed control manipulating member is disposed at a side of and above the accommodating part.

15. The handheld electric tool as claimed in claim 1, wherein the handheld electric tool further comprises an anti-abrasive block, the anti-abrasive block is disposed on the powering device, and when the handheld electric tool is vertically placed, the anti-abrasive block prevents the powering device from being in contact with the ground.

16. The handheld electric tool as claimed in claim 1, further comprising:
    an oil tank comprising:
        a tank body having an oil inlet and an accommodating chamber;
        a tank cover to seal the oil inlet;
        a filter, including a filter screen and being received in the accommodating chamber; and
        a connecting assembly, connecting the tank cover and the filter, wherein a portion of the connecting assembly connected to the filter is located in the accommodating chamber.

* * * * *